United States Patent
Choi (10) Patent No.: US 7,376,822 B2
(45) Date of Patent: May 20, 2008

(54) METHOD OF INITIALIZING MULTIPLE DEVICES USING JOB SCHEDULER

(75) Inventor: Hyok-sung Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 10/991,525

(22) Filed: Nov. 19, 2004

(65) Prior Publication Data

US 2005/0149938 A1 Jul. 7, 2005

(30) Foreign Application Priority Data

Dec. 23, 2003 (KR) .................... 10-2003-0095617

(51) Int. Cl.
*G06F 9/00* (2006.01)
*G06F 9/24* (2006.01)
*G06F 15/177* (2006.01)

(52) U.S. Cl. .................. 713/1; 713/2; 713/100

(58) Field of Classification Search .............. 713/1
See application file for complete search history.

(56) References Cited

U.S. PATENT DOCUMENTS 6,763,454 B2* 7/2004 Wilson et al. ................ 713/1
2001/0047473 A1* 11/2001 Fallon ........................... 713/2
2003/0041088 A1* 2/2003 Wilson et al. .............. 709/104
2004/0205258 A1* 10/2004 Wilson et al. ................. 710/1
2005/0229042 A1* 10/2005 Crowell et al. ............... 714/36
2005/0245273 A1* 11/2005 Kincaid .................. 455/456.4

FOREIGN PATENT DOCUMENTS

| CN | 1391670 A | 1/2003 |
| JP | 2001-306307 A | 11/2001 |
| JP | 2002-149281 A | 5/2002 |
| JP | 2002-278781 A | 9/2002 |
| JP | 2003-84981 A | 3/2003 |

* cited by examiner

*Primary Examiner*—Rehana Perveen
*Assistant Examiner*—Michael J Brown
(74) *Attorney, Agent, or Firm*—Sughrue Mion, PLLC

(57) ABSTRACT

Provided is a method of initializing multiple devices using a job scheduler. The method includes determining whether the devices to be initialized satisfy requirements for initialization, performing an initialization job on a device that has satisfied the requirements for initialization, determining whether another device that has satisfied the requirements for initialization exists, and performing the above-described steps until the initialization of all other devices has finished.

7 Claims, 6 Drawing Sheets

METHOD OF INITIALIZING MULTIPLE DEVICES USING JOB SCHEDULER

CROSS-REFERENCE TO RELATED APPLICATION

This application claims priority from Korean Patent Application No. 10-2003-0095617 filed on Dec. 23, 2003 in the Korean Intellectual Property Office, the disclosure of which is incorporated herein in its entirety by reference.

BACKGROUND OF THE INVENTION

1. Field of the Invention

The present invention relates to initializing devices and, more particularly, to a method of providing a means designed to efficiently initialize multiple devices using a job scheduling technique.

2. Description of the Related Art

Products that include multiple devices have increased in popularity, and it is necessary to initialize the devices in order for the product features to provide their service.

Furthermore, as a product becomes increasingly complicated and bulky, the types of devices and the number of devices constituting the product increase. Accordingly, the per-device initialization process has become more important when determining the value of the product. Thus, a key goal of device initialization is to perform stable initialization in the shortest amount of time possible.

Figure 1:
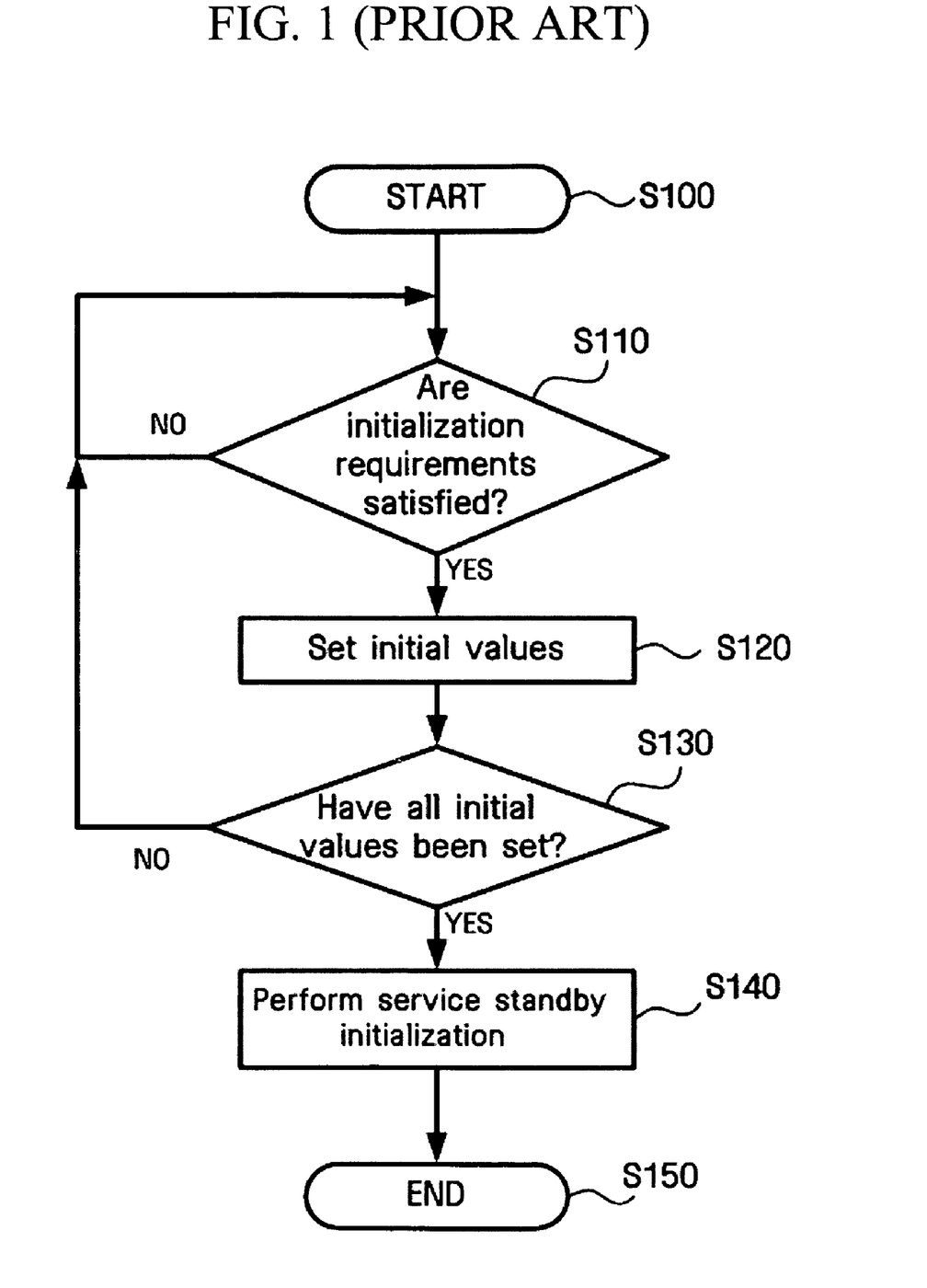
FIG. 1 is a flowchart illustrating an example of a conventional process of initializing a device.

FIG. 1 is a flowchart illustrating an example of a conventional process of initializing a device.

For a single device performing a predetermined function that provides a specific service, the device driver must undergo an initialization process for driving the device before the device is ready to provide its service.

That is, when a device driver that controls the device is started by an embedded operating system (step S100), the hardware and/or software requirements for the device initialization are checked to see if they have been satisfied (step S110). If the initialization requirements have not been satisfied, the device driver remains in a standby state and the device is periodically checked to see if those requirements have been satisfied. If the requirements have been satisfied, the initial values are set in accordance with the requirements (step S120). Then, a check is performed to see if all the initial values have been set for the initialization of the device driver (step S130). If all the initial values have been set, the device is initialized to enter a standby state prior to providing the pertinent service. That is, service standby initialization is performed (step S140). Then, the device initialization process terminates (step S150). On the other hand, if all the initial values have not been set (step S130), the process returns to checking initialization requirements (step S110).

Figure 2:
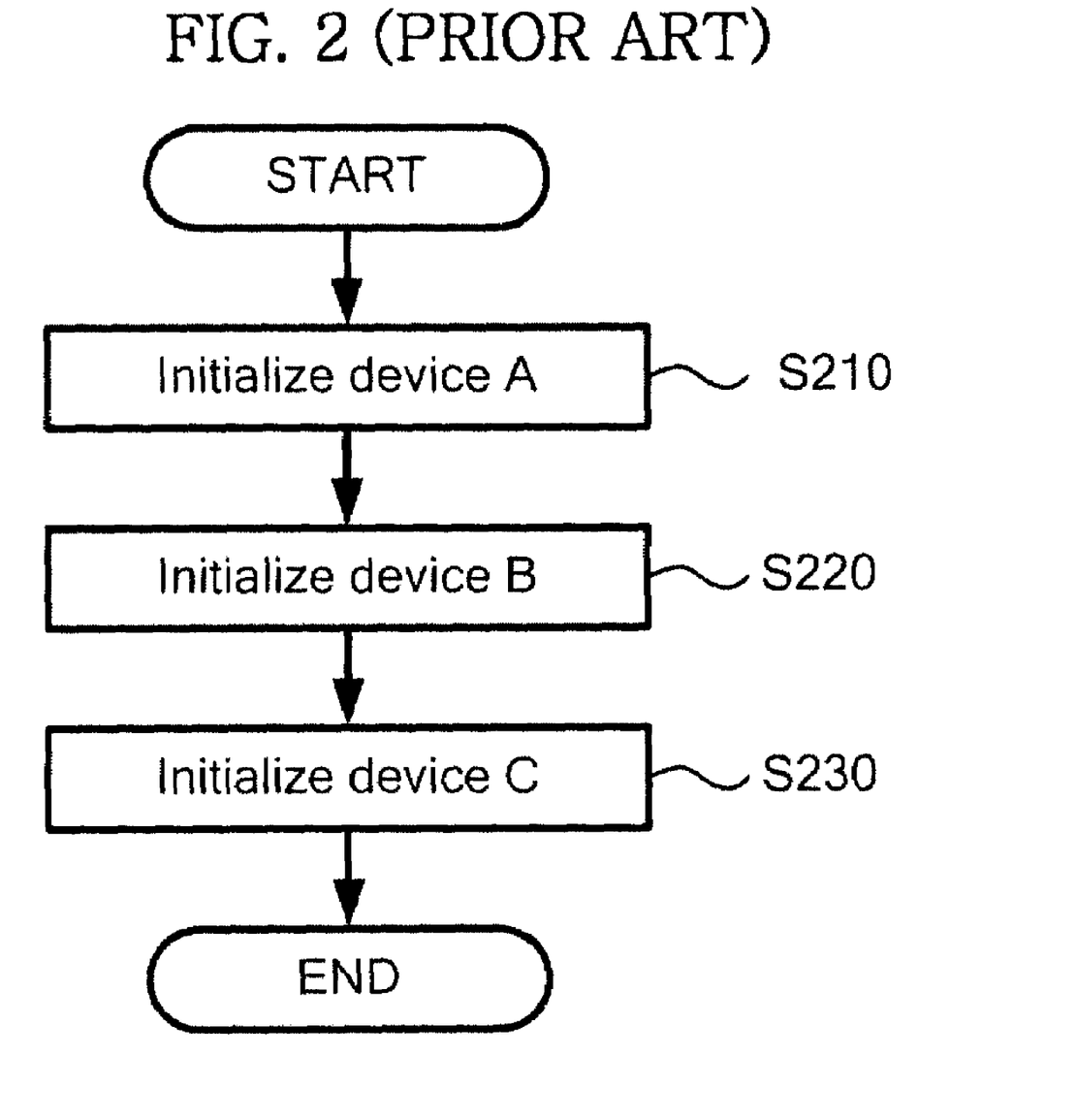
FIG. 2 is a flowchart illustrating an example of a conventional process of initializing multiple devices.

FIG. 2 is a flowchart illustrating an example of a conventional process of initializing multiple devices.

When a single system includes multiple devices, all the devices must be initialized in order for the system to provide a predetermined service that requires the initialization of each device. For example, when a system is comprised of three devices A, B, and C, as illustrated in steps S210-S230 of FIG. 2, the devices A, B, and C are sequentially initialized.

A specific, non-limiting example of a device initialization method may be a Linux kernel in an x86-based Linux system that sequentially executes various device drivers in order to perform device initialization. In this case, each device driver module probes for a device that it supports, and then it initializes the device and registers the pertinent service with the Linux kernel in a predetermined way. Because all the devices are initialized by repeating the above process for all the device driver modules, the process requires several minutes to boot.

Consequently, as is evident from FIGS. 1 and 2, the conventional device initialization process suffers from CPU idle-time due to the wait-periods and repeated performance of steps S110 and S130 each time a device is initialized. Because a significant amount of time is used to initialize a device that is slower than the CPU, the CPU idle-time increases, which then reduces the efficiency of the device initialization process. Thus, it is highly desirable to have a method of efficiently initializing multiple devices without wasting CPU resources.

SUMMARY OF THE INVENTION

The present invention provides a method of efficiently initializing multiple devices included in a system using a job scheduling technique.

An aspect of the present invention provides for a method of initializing multiple devices using a job scheduler. The method includes determining whether the devices to be initialized satisfy the requirements for initialization, performing an initialization job on a device that has satisfied the requirements for initialization, determining whether another device that has satisfied the requirements for initialization exists, and performing the above-described steps until the initialization of all the other devices has finished. Determining whether the devices satisfy the requirements for initialization may comprise preregistering job schedules for all the devices to be initialized. Preferably, but not necessarily, the job schedule is determined based on information on CPU time assigned for the initialization job.

Performing the initialization job may comprise setting predesignated initial values for the device that has satisfied the requirements for initialization, checking whether all the initial values have been set, and, if all the initial values have been set, performing an initialization to enter a standby state prior to providing the pertinent service. Preferably, but not necessarily, the method further comprises deleting the job schedule information for the device that has been initialized to enter a standby state prior to providing the service.

The method may also comprise performing an initialization job for another device that has satisfied the requirements for initialization even if all of the initial values have not been set on the current device.

BRIEF DESCRIPTION OF THE DRAWINGS

The above and other features and advantages of the present invention will be readily apparent by describing, in detail, exemplary embodiments thereof with reference to the accompanying drawings, in which.

DETAILED DESCRIPTION OF ILLUSTRATIVE, NON-LIMITING EMBODIMENTS OF THE INVENTION

A method of initializing multiple devices according to an exemplary embodiment of the present invention will now be described with reference to the accompanying drawings.

Figure 3:
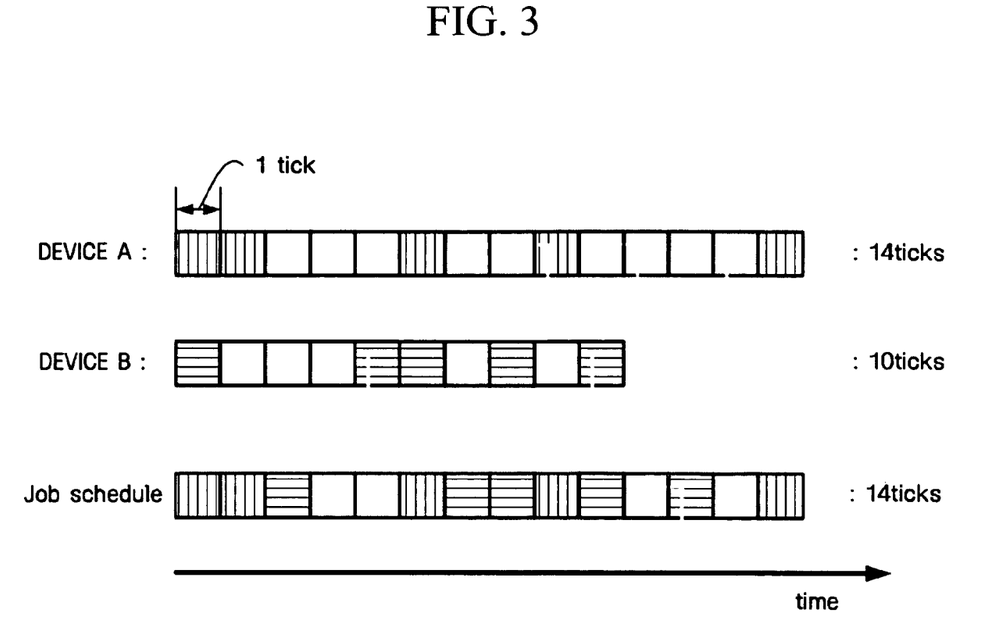
FIG. 3 is a diagram illustrating a job scheduling method according to an embodiment of the present invention.

FIG. 3 is a diagram illustrating a job scheduling method according to an embodiment of the present invention.

In FIG. 3, each small square represents the smallest unit of time in which a CPU operates. The width of a square is hereinafter called a 'tick'.

Also, each vertically hatched square represents the CPU execution time used to initialize device A, each horizontally hatched square represents the CPU execution time used to initialize device B, and each square without hatching represents the CPU idle-time. For example, in FIG. 3, when initializing device A, the CPU execution time and the CPU idle-time are 5 and 9 ticks, respectively. When initializing device B, the CPU execution time and the CPU idle-time are both 5 ticks.

When a conventional method is used, since the initialization of device A is followed by that of device B, the CPU time to initialize both devices is 24 ticks (14 ticks (device A) plus 10 ticks (device B)).

However, in the present invention, the CPU idle-time during each device initialization process is appropriately used to reduce the amount of initialization time. That is, when job scheduling is used as shown in FIG. 3, the CPU time spent for initialization is 14 ticks, which is 10 ticks faster than the conventional technique.

Figure 4:
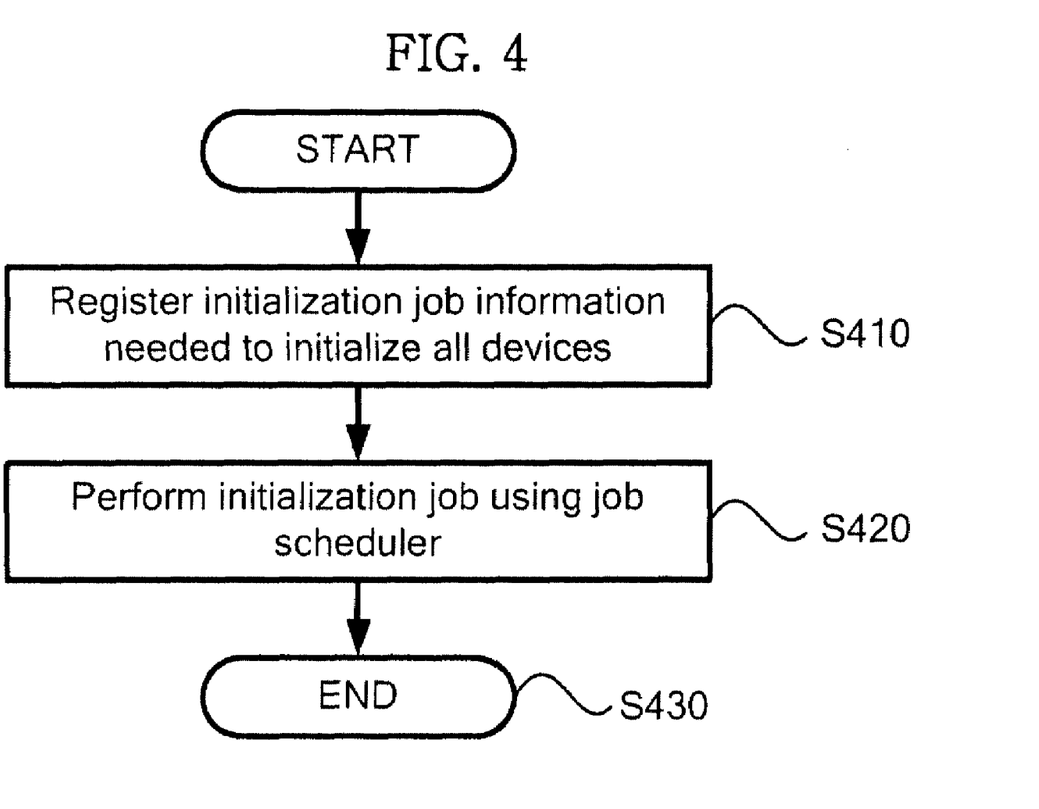
FIG. 4 is a flowchart illustrating the overall process of initializing a device according to an embodiment of the present invention.

FIG. 4 is a flowchart illustrating the overall process of initializing a device according to an embodiment of the present invention.

To initialize each device constituting a specific system, information needed to perform the initialization is registered in a physical storage area within the specific system or in a separate database implemented by software (step S410). The information may contain a device identifier, information about the initialization parameters, initialization commands, details of initialization, and other information.

Using the registered information, the system CPU then instructs a job scheduler implemented by software to perform a device initialization job. Then, the device initialization job is terminated (step S430). The job scheduler may function as a background processor when the system boots up.

Examples of data structures associated with the initialization job include an enumeration data type (job_state) that represents enumerated job states and a structure data type (device_job) that represents unit jobs for device initialization.

That is, the enumeration data type job_state may be defined as:

```
enum job_state = { hold, do, drop, done, fail }
```
where 'hold' denotes a state in which the function 'do' cannot be performed yet, 'do' is a state in which do_func determined in the structure data type device_job can be performed, 'drop' is a state in which a device is not present or is unavailable, and 'fail' is a state in which the device initialization has failed.

The structure data type device_job may also be defined as follows:

```
struct device_job{
    priority_level level;
    job_state lastJobState;
    job_state (*decide_func)(device_job &);
    unsigned long decide_timeout;
    job_state (*do_func)(device_job &);
    unsigned long do_timeout;
};
```

Here, 'level' represents the priority order of an initialization job, 'lastJobState' is a job_state data type indicating the last job state of device_job, and the '(*decide_func)(device_job &)' is a job_state data type representing a pointer to a function that determines the job state. The 'decide_timeout' is the maximum length of time in microseconds for which the job stays in the 'hold' state, and the '(*do func)(device_job &)' is a job_state data type representing a pointer to a function that is to be performed when the job state is 'do'. At this time, the state of job being executed is also determined. The 'do_timeout' represents the maximum length of time in microseconds for which do_func is executed.

An example of initialization of a disc device will now be described using the data structures described above.

The disc device driver remains in the 'hold' state until a disc drive spin rate exceeds the minimum revolutions per minute (RPM) as required. If the RPM requirement is met, a superblock is read using direct memory access (DMA). Then, if the details read from the superblock are satisfied, the disc is mounted.

If the initialization routine is defined as 'module_init', the initial registration of a device job for initialization is performed in the 'module_minit' routine as follows:

```
int module_init(void)
{
    device_job *dj;
    /* Priority_level is 10, decide_func is isSpinUp, decide_timeout is 4
    secs, do_func is doReadSuperBlock, and do_timeout is 1msec */
    dj=addDeviceJob(10, isSpinUp, 4000000, doReadSuperBlock, 1000);
    return 0;
}
```

In this case, decide_func and do_func may be implemented as follows:

```
char DmaBuffer[BLOCK_SIZE]; /* Buffer for reading a disc using DMA */
job_state isSpinUp(device_job &DJ)
{
    /* If a disc drive does not exist nor is supported as a result of probing, return to
    a drop state */
    if (!ProbeDiscDrive( )) return drop;
    /* If RPM does not reach minimum SpinUpRPM, return to a hold state, but if not,
    return to a do state */
    if (regRPM < MinSpinUpRPM) return hold;
    else return do;
```

```
}
job_state doReadSuperBlock(device_job &DJ)
{
/* Drive DMA to read block 0 (super block) into DmaBuffer. */
if(initiateDMA(DmaBuffer, 0)){
/* If DMA read setting is successful, determine the next decide_func and do_func
and return to a hold state */
    setDeviceJob(11, DJ, DMADone, 100000, doMount, 1000000);
/* Priority_level is 11, decide_func is DMADone, decide_timeout is 100 msecs,
do_func is doMount, and do_timeout is 1 sec */
    return hold;
} else return drop; /* If it fails, return to a drop state */
}
job_state isDMADone( )
{
if (isDoneDMA( )) return do; /* If DMA transmission is done, return to a do state */
else hold;              /* if it is not yet done, return to a hold state */
}
job_state doMount( )
{
/* If the details read out to DmaBuffer indicate that a disc has been mounted
successfully, return to a done state */
    if (mount(DmaBuffer)) return done;
    else return fail;      /* If the disc fails to be mounted, return to a fail
state */
}
```

Figure 5:
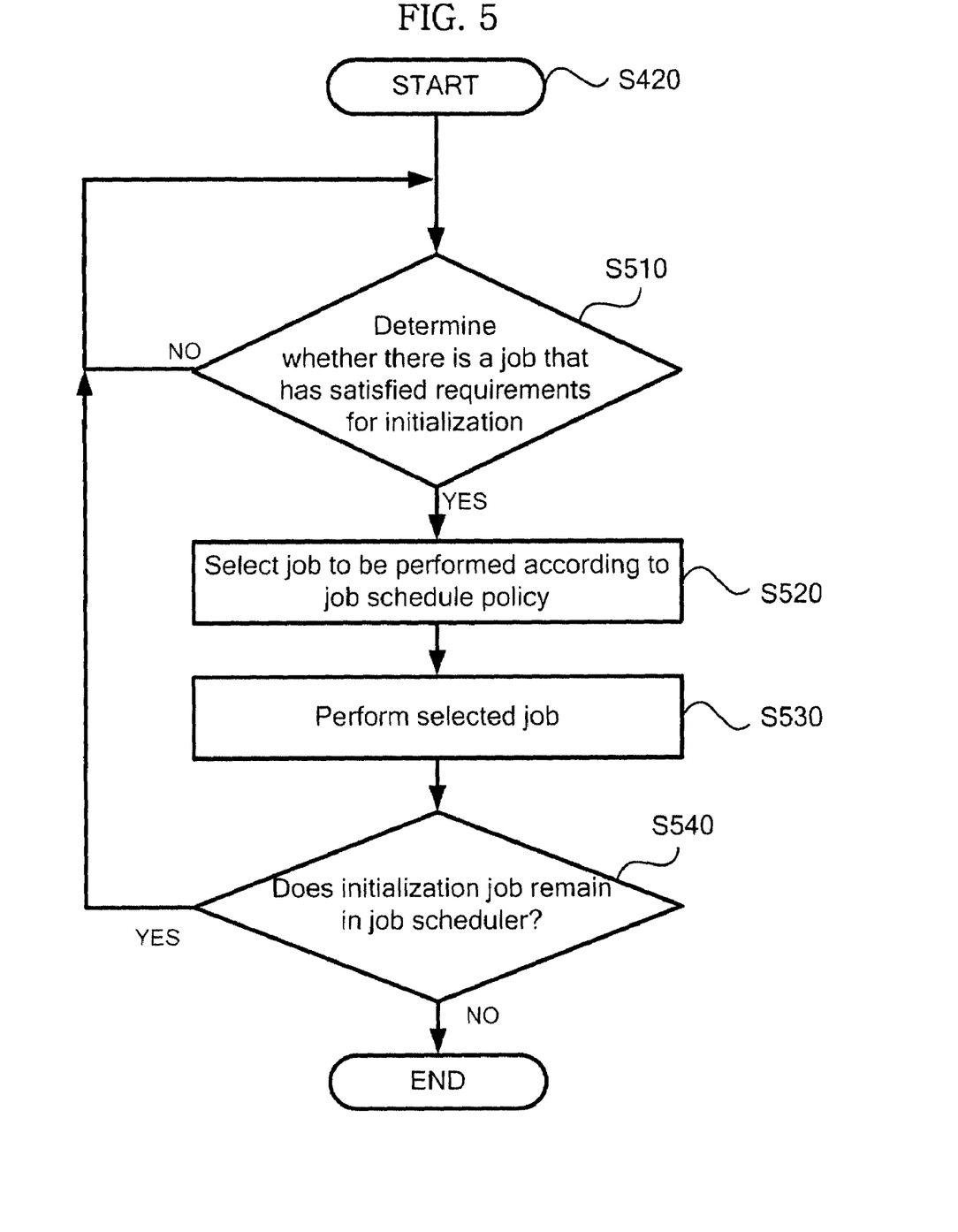
FIG. 5 is a flowchart illustrating a process of performing an initialization by a job scheduler according to an embodiment of the present invention.

FIG. 5 is a flowchart illustrating a process of performing the initialization job by the job scheduler (step S420) according to an embodiment of the present invention.

To perform the initialization job, first, a determination as to whether there is a job satisfying the requirements for performing device initialization is made (step S510). The requirements are checked for all devices to determine if they are satisfied. The requirements include all conditions that can be implemented in software such as logical expressions, time, and random number generation.

It is preferable, but not necessary, that a device driver determines whether the requirements for performing initialization have been satisfied. A process of registering device_job for initialization is set forth below:

```
list DJL; /* priority linked list for device_job */
device_job * addDeviceJob ( priority_level level,
```

-continued

```
                    job_state (*decide_func)(device_job &),
                                    unsigned long decide_timeout,
                                    job_state (*do_func)(device_job &);
    unsigned long do_timeout )
{
    device_job *nDJ = new device_job;
    nDJ->level = level;
    nDJ->decide_func = decide_func;
    nDJ->decide_timeout = decide_timeout;
    nDJ->do_func = do_func;
    nDJ->do_timeout = do_timeout;
    DJL.addlist(nDJ);            /* Add a new one to device_job list */
    return nDJ;
}
```

Meanwhile, a process for actually performing the initialization job is given below:

```
        while( !DJL.isEmpty( ) )   /* Continue to perform until no device_job remains in
the list */
        {
            device_job *DJ;
            /* Get device job with highest priority to be executed according to priority level and
scheduling method */
            DJ = DJL.getDeviceJob( );
            /* Install a watchdog timer to check decide_timeout */
            WD = setWatchDog(getCurrentTime( ), DJ->decide_timeout,
decide_timeout_handler( ));
            /* Execute decide_func to set the last job state */
            DJ->lastJobState = DJ->decide_func(*DJ);
            DO_STATE:
            switch (DJ->lastJobState)
            {
                case hold:          /* In a hold state, there is nothing to be done except timing out the
watchdog timer */
                break;
                case do:
                deleteWatchDog(WD); /* Delete WatchDog */
                WD = setWatchDog(getCurrnetTime( ), DJ->do_timeout, do_timeout_handler( ));
                /* Perform do_func to set the last job state */
```

-continued

```
    DJ->lastJobState = DJ->do_func(*DJ);
    goto DO_STATE; /* Go to DO_STATE rountine */
    case drop:
    case done:
    case fail:
    default:         /* Delete device_job from list in the case of drop, done, fail or others
*/
    deleteWatchDog(WD); /* Delete watchdog */
    DJL.removeList(DJ); /* Delete current device_job from the device job list */
    break;
    } /* switch */
    }      /* while */
```

After determining that there are jobs that have satisfied the initialization requirements, a job to be performed is selected according to a job schedule protocol from among jobs that meet the requirements. The job schedule protocol may be established using the registered initialization job information (step S410) or device information retained within a system, or the job schedule protocol may be specific to an operating system. For example, the first job to satisfy the requirements may be selected. Furthermore, the job schedule protocol may be established by a well-known scheduling method.

Once the job is selected (step S520), the selected job is performed (step S530). If any initialization jobs to be performed remain in the job scheduler (step S540), the process then determines if there is a job that has satisfied the requirements for initialization (step S510).

Figure 6:
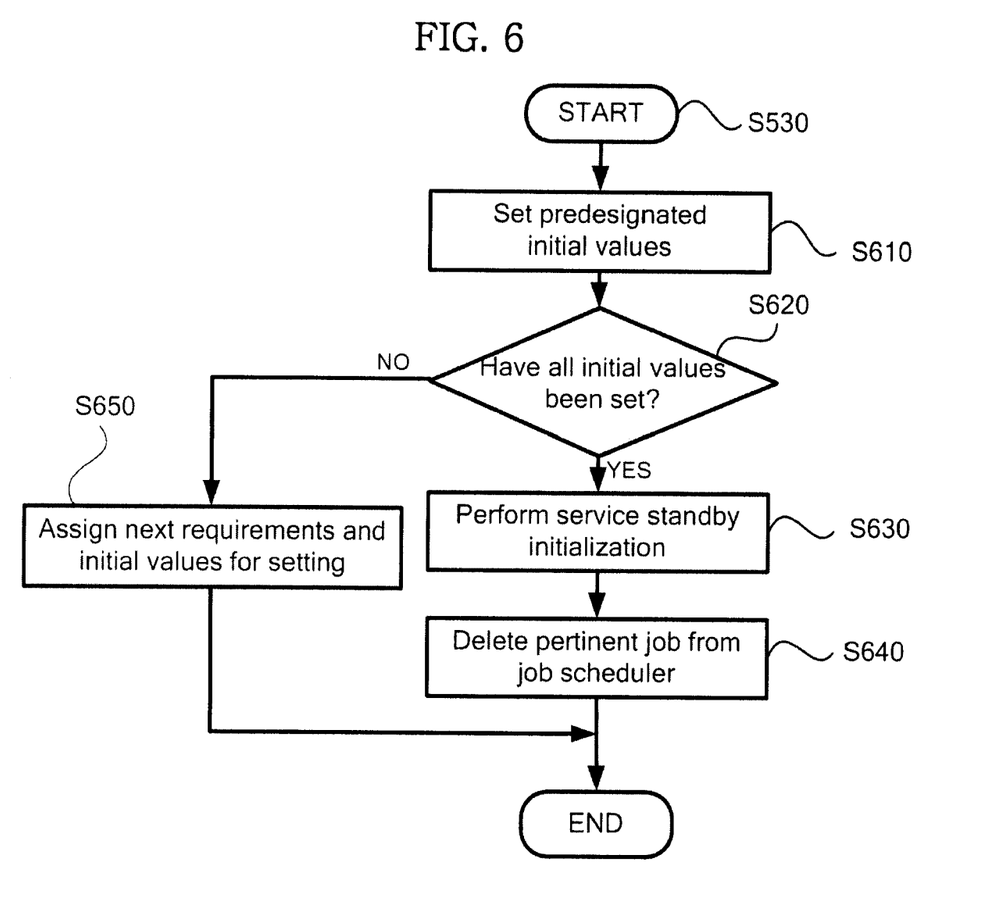
FIG. 6 is flowchart illustrating a process of initializing a device according to an embodiment of the present invention.

FIG. 6 is flowchart illustrating a process of initializing a device according to an embodiment of the present invention.

Specifically, in order to perform the selected job (step S530 in FIG. 5), predesignated initial values are set (step S610) and then checked to determine if all the initial values have been set for the currently selected job (step S620). In this case, all possible descriptions that are executable by a program, including assignment of functions to be performed by a device driver, address of the location to be branched, predetermined equations, and scripts containing details of job performed, may be specified in the initial value settings. If all the initial values are set for the currently selected job (step S620), the device is initialized to enter a standby state prior to providing the pertinent service (step S630). Then, the current job is deleted from the job scheduler (step S640). If all the initial values have not been set (step S620), the requirements and initial value settings needed to perform an initialization of the next device are assigned to the job scheduler (step S650).

The present invention provides a method of initializing multiple devices using the job scheduler, thereby efficiently reducing an initialization time when a system having multiple devices is booting up. Therefore, CPU resources are not wasted due to CPU idle-time that occurs when multiple devices are initialized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of initializing a plurality of devices, comprising:
   determining whether the plurality of devices satisfy requirements for initialization;
   performing an initialization job on a first device that has satisfied the requirements for initialization;
   determining whether a second device that has satisfied the requirements for initialization exists;
   performing all of the foregoing steps until the initialization of all devices in the plurality of devices has finished;
   wherein the determining whether the plurality of devices satisfy requirements for initialization comprises pre-registering job schedules for all devices to be initialized; and
   wherein the performing the initialization job comprises:
   setting initial values for the first device;
   checking whether all the initial values have been set; and
   if all the initial values have been set, initializing the first device to enter a standby state prior to providing a service.

2. The method of claim 1, wherein the job schedule is determined based on information on CPU time assigned for the initialization job.

3. The method of claim 1, further comprising deleting job schedule information for the first device after the first device has been initialized to enter the standby state.

4. The method of claim 1, further comprising performing an initialization job for the second device if all of the initial values have not been set for the first device.

5. A method of initializing a plurality of devices, comprising:
   determining whether the plurality of devices satisfy requirements for initialization;
   performing an initialization job on a first device that has satisfied the requirements for initialization;
   determining whether a second device that has satisfied the requirements for initialization exists; and
   performing all of the foregoing steps until the initialization of all devices in the plurality of devices has finished;
   wherein the performing the initialization job comprises:
   setting initial values for the first device;
   checking whether all the initial values have been set; and
   if all the initial values have been set, initializing the first device to enter a standby state prior to providing a service.

6. The method of claim 5, further comprising deleting job schedule information for the first device after the first device has been initialized to enter the standby state.

7. The method of claim 5, further comprising performing an initialization job for the second device if all of the initial values have not been set for the first device.

* * * * *